US009433964B2

(12) United States Patent
Kautto et al.

(10) Patent No.: US 9,433,964 B2
(45) Date of Patent: Sep. 6, 2016

(54) ROD-BED ASSEMBLY

(71) Applicants: Ari-Pekka Kautto, Jyskä (FI); Timo Lintula, Jyväskylä (FI)

(72) Inventors: Ari-Pekka Kautto, Jyskä (FI); Timo Lintula, Jyväskylä (FI)

(73) Assignee: Valmet Technologies, Inc., Espoo (FI)

( * ) Notice: Subject to any disclaimer, the term of this patent is extended or adjusted under 35 U.S.C. 154(b) by 161 days.

(21) Appl. No.: 14/292,149

(22) Filed: May 30, 2014

(65) Prior Publication Data

US 2014/0352609 A1     Dec. 4, 2014

(30) Foreign Application Priority Data

May 31, 2013   (EP) ..................................... 13170021

(51) Int. Cl.
| | | |
|---|---|---|
| *B05C 11/02* | (2006.01) | |
| *F16M 13/02* | (2006.01) | |
| *B05C 11/04* | (2006.01) | |
| *D21H 25/12* | (2006.01) | |

(52) U.S. Cl.
CPC ............ *B05C 11/025* (2013.01); *B05C 11/042* (2013.01); *B05C 11/044* (2013.01); *D21H 25/12* (2013.01); *F16M 13/02* (2013.01)

(58) Field of Classification Search
CPC . B05C 11/025; B05C 11/042; B05C 11/044; D21H 25/12; F16M 13/02
USPC ........ 118/100, 118, 119, 123, 126, 261, 262, 118/413, 414; 162/281; 101/120; 15/256.52; 248/534
See application file for complete search history.

(56) References Cited

U.S. PATENT DOCUMENTS

| | | | | |
|---|---|---|---|---|
| 2,676,563 | A | | 4/1954 | Montgomery et al. |
| 5,156,682 | A | * | 10/1992 | Zimmer .................... B05C 1/10 101/119 |
| 5,968,269 | A | * | 10/1999 | Richter ................. B05C 11/025 118/118 |
| 2004/0040498 | A1 | * | 3/2004 | Parni ....................... D21H 25/10 118/256 |
| 2010/0089313 | A1 | * | 4/2010 | Karusalmi ............. D21H 25/12 118/244 |

FOREIGN PATENT DOCUMENTS

| | | |
|---|---|---|
| DE | 10045515 | 4/2002 |
| EP | 13170021 | 5/2013 |
| WO | 0063494 | 10/2000 |
| WO | 03078077 A1 | 9/2003 |
| WO | 2007063183 A1 | 6/2007 |
| WO | 2010142513 A1 | 12/2010 |

OTHER PUBLICATIONS

International Search Report for EP13170021 dated Dec. 10, 2013.

* cited by examiner

*Primary Examiner* — Laura Edwards
(74) *Attorney, Agent, or Firm* — Stiennon & Stiennon

(57) ABSTRACT

A rod-bed assembly has a holder (30) and an insert (20) removably and insertably supported in a groove (31) of the holder (30), the rod-bed assembly being for a rod (10) rotatably supported in a recess (21) on a front side of the insert (20). Longitudinal bending of the holder (30) in a cross-direction is under 0.5%, advantageously under 0.35%, of the longitudinal distance between two profiling loading points of the holder (30).

20 Claims, 1 Drawing Sheet

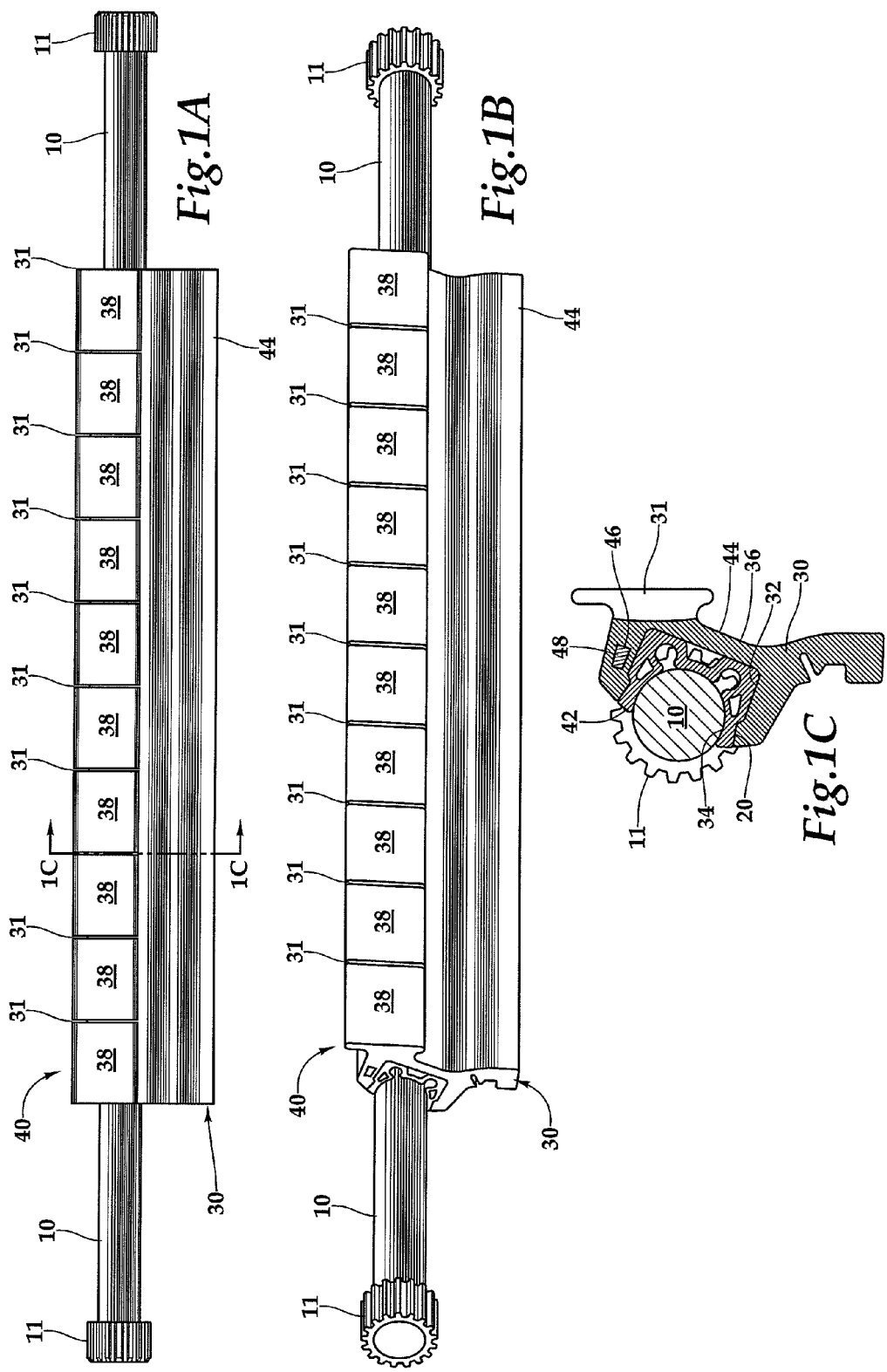

ROD-BED ASSEMBLY

CROSS REFERENCES TO RELATED APPLICATIONS

This application claims priority on European App. No. EP 13170021, filed May 31, 2013, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a rod-bed assembly and to be more precise to a rod-bed assembly for a rod of a device for coating or sizing a fiber web, particularly a paper or a board web, having a holder, an insert removably and insertably supported in a groove of the holder and the insert having a recess for a rod to be rotatably supported in the recess.

In this description and the claims by the term rod-bed assembly is meant the rod-bed comprising an insert and a holder. The rod-bed assembly is used for a rod of a device for coating or sizing a fiber web and the front side of a rod-bed assembly is the side on which the rod is located in use, i.e. the side that will face the fiber web to be coated or the sizing roll onto which the sizing agent is applied by the rod when sized. It should be noted that in prior art publications relating to rod-bed assemblies there are differences in the terminology used, for example in relation to the feature whether or not the rod is included in the assembly. In practice the rods and the rod-bed assemblies can be supplied to a device for coating or sizing a fiber web from different suppliers or from the same supplier.

As known from the prior art, fiber web producing processes typically comprise an assembly formed by a number of apparatuses arranged consecutively in the process line. A typical production and treatment line comprises a head box, a wire section and a press section as well as a subsequent drying section and a reel-up. The production and treatment line can further comprise other devices and sections for finishing the fiber web, for example, a sizer, a coating section and a calendar. The production and treatment line also comprises at least one winder for forming customer rolls as well as a roll packaging apparatus. In this description and the following claims by fiber webs are meant for example paper and board webs.

In production of fiber webs, for example of paper or board webs, sizing is used to alter the properties of a fiber web by adding sizing agents (sizing medium), for example glue chemicals. Sizing can be divided into internal sizing and surface sizing. In internal sizing the sizing agent is added to pulp in the wet end of the fiber web machine before forming. In surface sizing the sizing agent is added onto the surface of the fiber web at the dry end of the fiber web machine.

In the production of fiber webs, for example of paper or board webs, coating, especially the surface of a fiber web is formed with a layer of coating paste (coating medium) at a coating station followed by drying. The coating process can be divided in supplying the coating paste onto the web surface, which is called the application of the coating paste, as well as in the adjustment of the final amount of coating paste.

The coating or the sizing of a fiber web typically utilizes a coating device—a coater—or a sizing device—a sizer. In connection with the coaters and sizers different kinds of application technology for application of the coating or the sizing medium on the fiber web are employed in prior art arrangements, for example curtain technology or blade coating technology or rod coating technology or air brush coating technology or spray coating technology.

In the coating or sizing based on rod technology, rod-bed assemblies are used for the rod or doctor rod functioning as dosing and/or coating elements of the coating or sizing medium for applying the coating or sizing medium and/or scraping off the excessive medium quantity of the sizing or coating medium. In the sizing, the rod functions against a roll and in the coating the rod functions against the fiber web.

DE 100 45 515 A1 shows one example of a known rod-bed assembly which comprises a holder, a doctor bed made of elastic material inserted into the holder for rods. EP 1 485 209 A1 shows a further example of a known rod-bed assembly in which a metal doctor rod is insertable into a rod-bed made of elastomer. The rod-bed insert is inserted into a holding groove of a holder also made of elastomer. EP 1 954 880 A1 shows yet a further example of a known rod-bed assembly in which the rod cradle (the rod-bed) includes a frame profile (holder) equipped with an insert groove, an insert fitted to this equipped with a rod groove and a rod and locking elements for locking the insert into the frame profile. WO 2010/142513 shows also an example of a known rod-bed assembly comprising a holder made of composite material, a rod-bed made of polymer and a doctor rod rotatably supported in a bearing recess on the front side of the rod-bed. The holder is formed such that the rod-bed and the doctor rod are insertable into and removable from a socket provided in the holder in the radial direction of the rod, and the rod-bed comprises closed cavities for saving material.

Typically the holder of the rod-bed assembly is made of extruded polymer or composite material and the insert of the rod-bed assembly is made of extruded polymer, for example of extruded polyethene. The holder is made of a profile that is massive and rigid. Furthermore, the groove for the insert in the holder must be stiff in order to keep the fitting of the rod when located and in order to facilitate the use of cost effective materials for the insert manufacture. The typical C-shape of the groove further stiffens the profile.

It is a problem of the prior art that in the rod-bed assemblies the rigidity of the holder prevents cross-directional profiling in dosing sizing or coating medium. By cross-directional profiling is meant the profiling in the cross-direction of the fiber web to be sized or coated in relation to the running direction of the fiber web.

SUMMARY OF THE INVENTION

An object of the present invention is to create a rod-bed assembly which provides for cross-directional profiling of dosing the sizing or coating medium.

In order to achieve the above objects and to solve the problems of the prior art mentioned above and becoming apparent later, the rod-bed assembly according to the invention has longitudinal bending in a cross-direction of under 0.5%, advantageously under 0.35%, of the longitudinal distance between two profiling loading points of the holder.

In this description and the following claims by the terms longitudinal and longitudinal direction in reference to the holder is meant the direction of the holder when it is placed in the coater or sizer that is cross-directional to the main running direction of the web, i.e. the CD-direction of the fiber web machine. The cross-direction of the holder is perpendicular to the longitudinal direction and corresponds to the CD-direction of the machine and is simultaneously the loading direction of the rod located in the rod-bed, when in use. Profiling loading points of the holder are spaced apart in the longitudinal direction of the holder. At profiling loading points are located means that provide profiling of the holder so that the holder bends a desired amount in the CD-direction of the fiber web machine to provide the desired dosing of the sizing or coating medium in the cross-direction of the fiber web. When the longitudinal bending in the cross-direction is under 0.5% of the longitudinal distance between two profiling loading points, for example the distance between the two profiling loading points is 100 mm and the bending of the holder is 0.5 mm.

According to one aspect of the invention the rod-bed assembly comprises a holder, an insert removably and insertably supported in a groove of the holder and in which rod-bed assembly a rod of a coating or sizing device is rotatably supported in a recess on the front side of the insert and in which rod-bed assembly the holder is made of composite material of which fiber orientation and fiber structure is such that the stiffness modulus of the holder in its longitudinal direction is low. By the low longitudinal modulus of the holder it is achieved that the holder is flexible in the cross-direction of the fiber web running direction, i.e. in the longitudinal direction of the holder, thus providing the possibility of cross-directional profiling of the sizing or coating medium amount but still rigid in the cross-sectional direction thus providing for secure holding of the insert. Advantageously the longitudinal modulus of the holder is 8-40 GPa, more advantageously 8-15 GPa.

According to one aspect of the invention the rod-bed assembly comprises a holder, an insert removably and insertably supported in a groove of the holder and in which rod-bed assembly a rod of a coating or sizing device is rotatably supported in a recess on the front side of the insert and in which rod-bed assembly the holder comprises at its back side at least one cut or at least one notch. By this the forces needed to bend the holder as required in the cross-direction i.e. in its longitudinal direction for cross-directional profiling of dosing of the sizing or coating agent are lower than without the cut or the notch. The surface area of the cuts and/or notches is 5-40%, advantageously 10-30%, of the back side surface area of the holder. By this the force reduction is at least 10-40%.

According to one aspect of the invention the rod-bed assembly comprises a holder, an insert removably and insertably supported in a groove of the holder and in which rod-bed assembly a rod of a coating or sizing device is rotatably supported in a recess on the front side of the insert and in which rod-bed assembly the holder comprises more than one holder unit that are assembled juxtaposed in longitudinal direction to form the holder. The holder units are advantageously assembled to each other by a formfitting shape and further kept together by the insert. Advantageously each holder unit has a corresponding hole or form in longitudinal direction for a push through attaching element that extends over the cross-direction i.e. over the longitudinal direction of the holder composed of the holder units. The attaching element is advantageously exchangeable in its longitudinal stiffness modulus so that for different cross-directional profiling needs attaching elements of different stiffness modulus are used. The different stiffness modulus is provided for example by material choice, for example either carbon or glass fiber composite material is used of, for example, the structure or shape of the attaching element is different for different needs. Advantageously the length of one holder unit is at least 0.5 m, advantageously 2-3 m.

BRIEF DESCRIPTION OF THE DRAWINGS

In the following the invention is described in more detail with reference to the accompanying drawings.

FIG. 1A is a schematic front elevational view of a rod-bed-bed assembly according to the invention.

FIG. 1B is an axonometric schematic rear elevational view of the rod-rod-bed assembly of FIG. 1A.

FIG. 1C is a cross-sectional view of the apparatus of FIG. 1A taken along section line 1C-1C.

DESCRIPTION OF THE PREFERRED EMBODIMENTS

In the following description relating to the figures the same reference signs are used for corresponding parts and part components unless otherwise mentioned.

In FIGS. 1A-1C is schematically shown the rod-bed assembly comprising a holder 30, and an insert 20 removably and insertably supported in a groove 32 of the holder 30. Into the rod-bed assembly a rod 10 of a coating or sizing device for dosing the coating or the sizing medium is rotatably supported in a recess 34 on the front side of the insert 20. The holder 30 comprises at its back side 36 at least one cut or at least one notch 31. By this the forces needed to bend the holder 30 as required in the cross-direction i.e. in its longitudinal direction for cross-directional profiling of dosing of the sizing or coating agent are lower than without the cut or the notch 31. The rod 10 comprises at each end a transmitting element 11 for the rotational movement. In the example of the figure the holder 30 has nine cuts or notches 31 evenly spaced apart along the holder 30.

The holder 30 is placed in a coater or sizer (not shown) which extends in a cross-direction perpendicular to a machine direction defined by the main running direction of the web being sized or coated. The rod 10 is loaded in the machine direction to engage the web being sized or coated. Profiling loading points or surfaces 38 of the holder are spaced apart on the holder in a longitudinal direction defined by the holder 30, i.e., in the cross direction, to facilitate the loading of the rod 10 in the machine direction so the rod can be moved to engage the web being sized or coated. The loading points or surfaces 38 are formed on the holder by the cuts or notches which separate and define the loading points or surfaces on the holder 30. Loading devices (not shown) are positioned to engage the loading points 38 so as to allow profiling of the holder by bending the holder a desired amount toward the fiber web to control desired dosing of the sizing or coating medium along the cross-direction of the fiber web. Bending in the cross-direction is kept to under 0.5% of the longitudinal distance between two profiling loading points, when the distance between the two profiling loading points 38 is 100 mm i.e., 100 mm between the cuts or notches, and the deflection of the holder is under 0.5 mm.

According to one aspect of the invention a rod-bed assembly 40 comprises the holder 30 and the insert 20 removably and insertably supported in the groove 32 of the holder in which a rod 10 in turn is in a recess 34 on the front side 42 of the insert. The holder 30 is made of composite material with a fiber orientation and fiber structure such that the stiffness modulus of the holder in its longitudinal direction is low. The low longitudinal modulus of the holder makes the holder flexible in the cross-direction of the fiber web running direction i.e. in the longitudinal direction of the holder. The holder flexibility provides for the possibility of cross-directional profiling of the sizing or coating medium amount while still providing rigidity in a cross-sectional direction of the holder 30, thus providing for secure holding of the insert 20. Advantageously the longitudinal modulus of the holder is 8-40 GPa, more advantageously 8-15 GPa.

The surface area of the cuts and/or notches is 5-40%, advantageously 10-30%, of the back side surface area of the holder. By this the force reduction is at least 10-40%.

In the rod-bed assembly 40 the holder 30 is comprised of a plurality of holder units 44 that are assembled juxtaposed in the longitudinal direction to form the holder. The holder units are advantageously assembled to each other by having a formfitting shape and further kept together by the insert 20. As shown in FIG. 1C each holder unit 44 has a corresponding hole or form 46 which extends in the longitudinal direction for a push through attaching element 48 that extends over the cross-direction, i.e. over the longitudinal direction of the holder 30 composed of the holder units 44. The attaching element 48 may be exchangeable with an attaching element with a different longitudinal stiffness modulus so that for different cross-directional profiling needs attaching elements of different stiffness modulus may be used. The different stiffness modulus is provided, for example, by material choice, for example either carbon or glass fiber composite material is used to form the attaching element, and/or the structure or shape of the attaching element is different for different needs. Advantageously the length of one holder unit is at least 0.5 m, advantageously 2-3 m.

Above with reference to the figures the invention has been explained with reference to an advantageous example only to details of which the invention is not to be narrowly limited.

We claim:

1. A rod-bed assembly for coating or sizing a fiber web, the assembly comprising:
    an integral unitary holder formed of a composite material extending in a longitudinal direction and having a front side and portions forming an insert receiving groove on the front side, the holder being made of composite material with a fiber orientation and fiber structure such that the stiffness modulus of the holder in its longitudinal direction is low, the low longitudinal modulus of the holder making the holder flexible in a cross-direction of the fiber web running direction and providing for the possibility of cross-directional profiling of a sizing or coating medium amount while still providing rigidity in a cross-sectional direction of the holder, thus providing for secure holding of an insert;
    wherein the holder has a back side, and a back side surface opposite the front side, the back side defining a width in the longitudinal direction, and having a plurality of notches, each notch defining a notch width, which notches divide the back side surface into a plurality of surfaces which define profiling loading points;
    wherein a sum of the width of each of the plurality of notches comprises 5-40% of the backside width; and
    an insert removably and insertably supported in the groove of the holder, the insert having a front arranged to face a fiber web, and portions forming a recess which is arranged to support a rod for rotation in the recess on the front side of the insert.

2. The rod-bed assembly of claim 1 wherein the holder is made of composite material such that the holder has a longitudinal modulus of 8-40 Gpa.

3. The rod-bed assembly of claim 2 wherein the holder has a longitudinal modulus of 8-15 Gpa.

4. The rod-bed assembly of claim 3 wherein the sum of the width of each of the plurality of notches comprises 10-30% of the backside width.

5. The rod-bed assembly of claim 1 wherein the holder comprises a plurality of holder units that are assembled juxtaposed in a cross-machine direction to form the holder.

6. The rod-bed assembly of claim 5 wherein the holder units are assembled to each other by a formfitting shape and are further kept together by the insert.

7. The rod-bed assembly of claim 5 wherein the holder units have a length of at least 0.5 meters.

8. The rod-bed assembly of claim 5 wherein each holder unit has a corresponding hole or form in the cross-machine direction for push through of an attaching element that extends over the longitudinal direction of the holder composed of the holder units.

9. The rod-bed assembly of claim 8 wherein the attaching element is exchangeable for different longitudinal directional profiling needs attaching elements of different longitudinal stiffness modulus are used.

10. A rod-bed assembly for coating or sizing a fiber web, the assembly comprising:
    an integral unitary holder formed of a composite material extending in a longitudinal direction and having a front side and portions forming an insert receiving groove on the front side, the holder being made of composite material with a fiber orientation and fiber structure such that the stiffness modulus of the holder in its longitudinal direction is low, the low longitudinal modulus of the holder making the holder flexible in a cross-direction of the fiber web running direction and providing for the possibility of cross-directional profiling of a sizing or coating medium amount while still providing rigidity in a cross-sectional direction of the holder, thus providing for secure holding of an insert;
    wherein the holder extends in a longitudinal direction and wherein the holder has a back side, and a back side surface opposite the front side, the back side defining a width in the longitudinal direction, and having a plurality of notches, each notch defining a notch width, which notches divide the back side surface into a plurality of surfaces which define profiling loading points; wherein the plurality of notches extend into the holder toward the groove such that the holder has a longitudinal modulus of 8-40 Gpa; wherein a sum of the width of each of the plurality of notches comprise 10-30% of the backside width; and
    wherein the insert is removably and insertably supported in the groove of the holder, the insert having a front side arranged to face a fiber web, and portions forming a recess which is arranged to support a rod for rotation in the recess on the front side of the insert.

11. The rod-bed assembly of claim 10 wherein the holder has a longitudinal modulus of 8-15 Gpa.

12. The rod-bed assembly of claim 10 wherein the holder comprises a plurality of holder units that are assembled juxtaposed in a cross-machine direction to form the holder.

13. The rod-bed assembly of claim 12 wherein the holder units are assembled to each other by a formfitting shape and are further kept together by the insert.

14. The rod-bed assembly of claim 12 wherein the holder units have a length of at least 0.5 meters.

15. The rod-bed assembly of claim 12 wherein each holder unit has a corresponding hole or form in the cross-machine direction for push through of an attaching element that extends over the longitudinal direction of the holder composed of the holder units.

16. The rod-bed assembly of claim 15 wherein the attaching element is exchangeable for different longitudinal directional profiling needs attaching elements of different longitudinal stiffness modulus are used.

17. A rod-bed assembly for coating or sizing a fiber web, the assembly comprising:

a plurality of holder units, each holder unit having a length of at least 0.5 meters;

each of the plurality of holder units forming an integral unitary holder unit formed of a composite material extending in a longitudinal direction and having a unit front side and portions forming an insert receiving groove on the front side, the holder units being made of composite material with a fiber orientation and fiber structure such that the stiffness modulus of each holder unit in the longitudinal direction is low, the low longitudinal modulus of each holder unit making the integral unitary holder unit flexible in a cross-direction of the fiber web running direction and providing for the possibility of cross-directional profiling of a sizing or coating medium amount while still providing rigidity in a cross-sectional direction of the holder unit, thus providing for secure holding of an insert;

wherein the holder units are arranged end to end in a cross-machine direction to form part of the rod-bed assembly;

wherein each holder unit has a back side, and a back side surface opposite the front side, the back side defining a width in the longitudinal direction, and having a plurality of notches, each notch defining a notch width, which notches divide the back side surface into a plurality of surfaces which define profiling loading points; wherein the plurality of notches extend into the holder unit toward the groove such that the holder unit has a longitudinal modulus of 8-40 Gpa;

wherein a sum of the width of each of the plurality of notches of each holder unit comprises 10-30% of the backside width of each holder unit;

wherein the insert is removably and insertably supported in the insert receiving groove on the front sides of the holder units, the insert having a front side arranged to face a fiber web, and portions of the front side forming a recess in which the insert lines the insert receiving groove; and a rod rotatably mounted for rotation in the recess on the front side of the insert.

18. The rod-bed assembly of claim 17 wherein each holder unit has a longitudinal modulus of 8-15 Gpa.

19. The rod-bed assembly of claim 17 wherein each holder unit has a hole in the cross-machine direction, the holes of each holder unit together extending over the longitudinal direction of the holder unit; and an attaching element positioned within the holes of each holder unit to join the plurality of holder units together.

20. The rod-bed assembly of claim 19 further comprising an exchangeable attaching element which is positionable within the holes of each holder unit to change the longitudinal modulus of the rod bed assembly.

* * * * *